Jan. 3, 1961   R. B. BENTLEY   2,966,885
FISH FEEDING DEVICE
Filed June 14, 1957
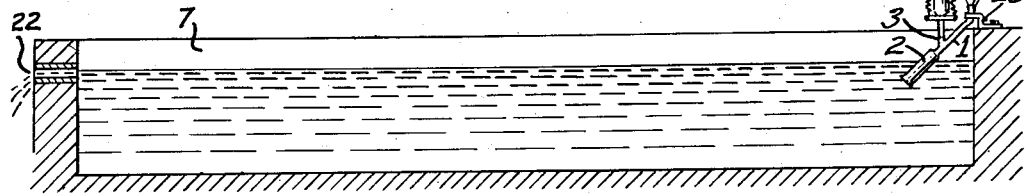
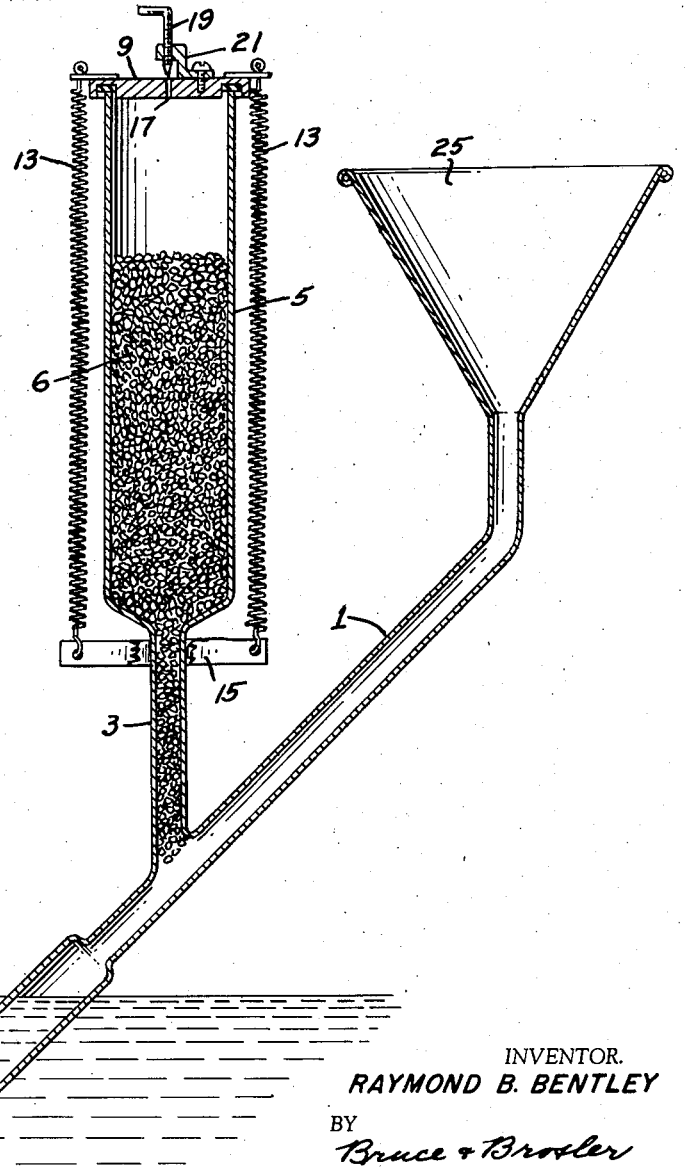
INVENTOR.
RAYMOND B. BENTLEY
BY
Bruce + Brosler
HIS ATTORNEYS

2,966,885

FISH FEEDING DEVICE

Raymond B. Bentley, 762 Bayview Ave.,
Pacific Grove, Calif.

Filed June 14, 1957, Ser. No. 665,749

6 Claims. (Cl. 119—51)

My invention relates to the raising of fish in large tanks or pools and more particularly to a device for feeding fish in tanks such for example, as are in trout hatcheries.

In the feeding of fish in large tanks, as at trout hatcheries, it is the prevailing practice to employ a screen type ladle which is filled with ground liver or other fish food and held submerged in the water while the food is stirred through the screen with a stick to then spread around to be picked up by the fish. Inasmuch as the water in such tanks is continually being changed, a substantial portion of food is carried out of the tank with the overflow before the fish have an opportunity to find and consume it all.

Among the objects of my invention are:

(1) To provide a novel and improved means for distributing food to fish;

(2) To provide a novel and improved means for the feeding of fish in tanks where there exists a continuous flow of water;

(3) To provide a novel and improved means for the feeding of fish which can be adjusted as to the rate at which the food may be dispensed;

(4) To provide a novel and improved means for the feeding of fish, which is economical in its operation.

Additional objects of my invention will be brought out in the following description of a preferred embodiment of the same taken in conjunction with the accompanying drawings wherein, Fig. 1 is a view depicting the device of the present invention, installed in operating position at one end of a fish tank;

Fig. 2 is an enlarged view depicting the device as an article of manufacture.

Referring to the drawings for details of my invention in its preferred form, the same comprises a tube 1 constituting means through which to pass water, the discharge end 2 preferably being enlarged. Connecting with this tube at an intermediate point thereof, by way of a discharge connection 3 is a food container 5 adapted to receive ground liver or other food 6 to be dispensed therefrom into a tank 7.

The container is provided with a removable closure 9 which fits rather snugly around the upper edge of the container when applied thereto, to provide an airtight seal. One manner of accomplishing this is to provide a circular groove 11 in the underside of the closure, of a diameter to fit the upper edge of the container, and hold the closure in place under pressure. Such pressure may be applied through a pair of diametrically disposed springs 13, each anchored at one end to the closure and connected under tension at its other end to a bracket 15 straddling the connection 3. This arrangement permits of the closure being readily removable when necessary for the replenishing of the container with food. A sealing means such as a rubber ring or sealing material in the groove may be resorted to, to assure effective sealing.

The closure is further provided with a leak opening 17 therethrough, the effective size of which may be altered by means such as a needle valve 19 threadedly mounted in a bracket 21 on the closure and in alignment with the leak opening, whereby, upon adjustment of the valve, the rate of air intake into the container may be adjusted from zero to a maximum, when sub-atmospheric pressure exists within the container.

When put to use, the assembly is supported preferably at that end of the tank opposite the overflow 22, by means of any suitable bracket 23 with the enlarged end of the tube being under water. The upper end of the tube may terminate in a funnel 25, or suitable hose connection, whereby a continual flow of water through the tube may be maintained for any desired period of time. Such flow of water through the tube creates a sub-atmospheric pressure in the connection 3 and due to the initial existence of atmospheric pressure within the container, the differential pressure thus created will cause the food to feed slowly into tube 1 and mix with the inflowing water, to be carried into the pool.

The rate at which the food will be so withdrawn will depend upon the rate at which the atmospheric air may be drawn into the container to re-establish and maintain a higher pressure therein. Inasmuch as this may be adjusted with the needle valve, it follows that the rate at which the food may be supplied to the tank from the container may be controlled and adjusted to the rate at which such food may be consumed by the fish in the tank. The rate of feed thus established, is automatically maintained so long as the supply lasts, and wastage of such food through being carried away with the overflow, is thereby substantially eliminated.

It becomes apparent from the foregoing that my invention fulfills all the objects thereof and while I have disclosed one embodiment in some detail, the same is subject to alteration and modification without departing from the underlying principles involved, and I accordingly do not desire to be limited in my protection to the specific details illustrated and described except as may be necessitated by the appended claims.

I claim:

1. Apparatus for the dispensing of food in a fish tank having an edge comprising a water supply tube for such tank, means for supporting said tube at the edge of a fish tank with one end terminating below water level in such tank, a substantially sealed food container having a discharge connection to said tube at an intermediate point thereon, said discharge connection having a cross section sufficient to permit withdrawal of ground liver and the like from said container under conditions of liquid flow through said supply tube, and leak means in said food container for admitting air to said food container under conditions of sub-atmospheric pressure therein.

2. In combination, a fish tank, and apparatus for the dispensing of food in said tank, said apparatus comprising a water supply tube, means supporting said tube at the edge of said tank with said tube directed toward the water in said tank, a substantially sealed food container having a discharge connection to said tube at an intermediate point thereon, said discharge connection having a cross section sufficient to permit withdrawal of ground liver and the like from said container under conditions of liquid flow through said supply tube, and leak means for admitting air to said food container under conditions of sub-atmospheric pressure therein.

3. Apparatus for the dispensing of food in a fish tank having an edge comprising a water supply tube for such tank, means for supporting said tube at the edge of a fish tank with one end terminating below water level in such tank, a food container having a discharge connection to said tube at an intermediate point thereon, said discharge connection having a cross section sufficient to permit withdrawal of ground liver and the like from said container under conditions of liquid flow through said supply tube, a sealable closure fitting said container, and an air intake valve in said closure.

4. In combination, a fish tank, and apparatus for the dispensing of food in said tank, said apparatus comprising a water supply tube, means for flowing water through said tube, a food container having a discharge connection to said tube at an intermediate point thereon, said discharge connection having a cross section sufficient to permit withdrawal of ground liver and the like from said container under conditions of liquid flow through said supply tube, a sealable closure fitting said food container, an air intake valve in said closure, and means supporting said apparatus with one end of said tube below water level.

5. Apparatus for the dispensing of food in a fish tank having an edge comprising a water supply tube for such tank, means for supporting said tube at the edge of a fish tank with one end terminating below water level in such tank, a food container having a discharge connection to said tube at an intermediate point thereon, said discharge connection having a cross section sufficient to permit withdrawal of ground liver and the like from said container under conditions of liquid flow through said supply tube, a sealable closure fitting said container, and an adjustable air intake valve in said closure.

6. In combination, a fish tank, and apparatus for the dispensing of food in said tank, said apparatus comprising a water supply tube, means for flowing water through said tube, a food container having a discharge connection to said tube at an intermediate point thereon, said discharge connection having a cross section sufficient to permit withdrawal of ground liver and the like from said container under conditions of liquid flow through said supply tube, a sealable closure fitting said food container, an adjustable air intake valve in said closure, and means supporting said apparatus with one end of said tube below water level.

References Cited in the file of this patent

UNITED STATES PATENTS

| | | |
|---|---|---|
| 950,999 | Erlwein et al. | Mar. 1, 1910 |
| 1,769,266 | Lusier | July 1, 1930 |
| 1,847,869 | Fawcett | Mar. 1, 1932 |
| 1,848,708 | Gatchet | Mar. 8, 1932 |
| 1,868,893 | Gentle | July 26, 1932 |
| 1,976,962 | Pape | Oct. 16, 1934 |
| 2,083,851 | Marcy | June 15, 1937 |
| 2,504,506 | Du For | Apr. 18, 1950 |
| 2,601,672 | Gatchet | June 24, 1952 |
| 2,680,044 | Smith | June 1, 1954 |
| 2,682,428 | Roberts | June 29, 1954 |